United States Patent [19]

Frase et al.

[11] 4,398,478
[45] Aug. 16, 1983

[54] SEED PLANTER APPARATUS WITH COVERING WHEEL

[75] Inventors: Roland J. Frase, Roselle; Edward L. Robinson, Jr., Naperville, both of Ill.

[73] Assignee: International Harvester Co., Chicago, Ill.

[21] Appl. No.: 270,202

[22] Filed: Jun. 3, 1981

[51] Int. Cl.³ .............................................. A01C 5/06
[52] U.S. Cl. ...................................... 111/85; 111/88
[58] Field of Search ............... 111/52, 85, 88, 59, 111/62, 65, 66, 69, 87

[56] References Cited

U.S. PATENT DOCUMENTS

| | | | |
|---|---|---|---|
| 1,020,681 | 3/1912 | Binns, Jr. | 111/52 |
| 1,901,298 | 3/1933 | Johnson | 111/52 |
| 1,901,299 | 3/1933 | Johnson | 172/536 |
| 4,009,668 | 3/1977 | Brass et al. | 111/88 |
| 4,273,057 | 6/1981 | Pollard | 111/85 |

*Primary Examiner*—Edgar S. Burr
*Assistant Examiner*—David A. Wiecking

*Attorney, Agent, or Firm*—Dennis K. Sullivan; F. David AuBuchon

[57] ABSTRACT

An apparatus that includes a frame supported pair of rotatably mounted furrow forming disks, a seed tube extending between the disks for depositing seed in a furrow, a pair of individually mounted and frame supported gauge wheel structures, each structure including a support pivotally mounted on said frame, a wheel located generally adjacent an outer surface of a disk and rotatably mounted on the support, adjustment structure for moving the supports and thus said wheels to vary furrow depth, and a furrow closing and seed soil contact assembly, said assembly including arm structure pivotally mounted on said frame and extending rearwardly to rotatably support furrow closing and seed soil contact structure rearward of the disks and a spring connected to the frame above the arm structure pivot and to the arm structure below and forward of the pivot, the spring biasing the furrow closing and seed soil contact structure downwardly with the same increase of force on the soil with the same increase in furrow depth for uniform seed soil pressure.

8 Claims, 9 Drawing Figures

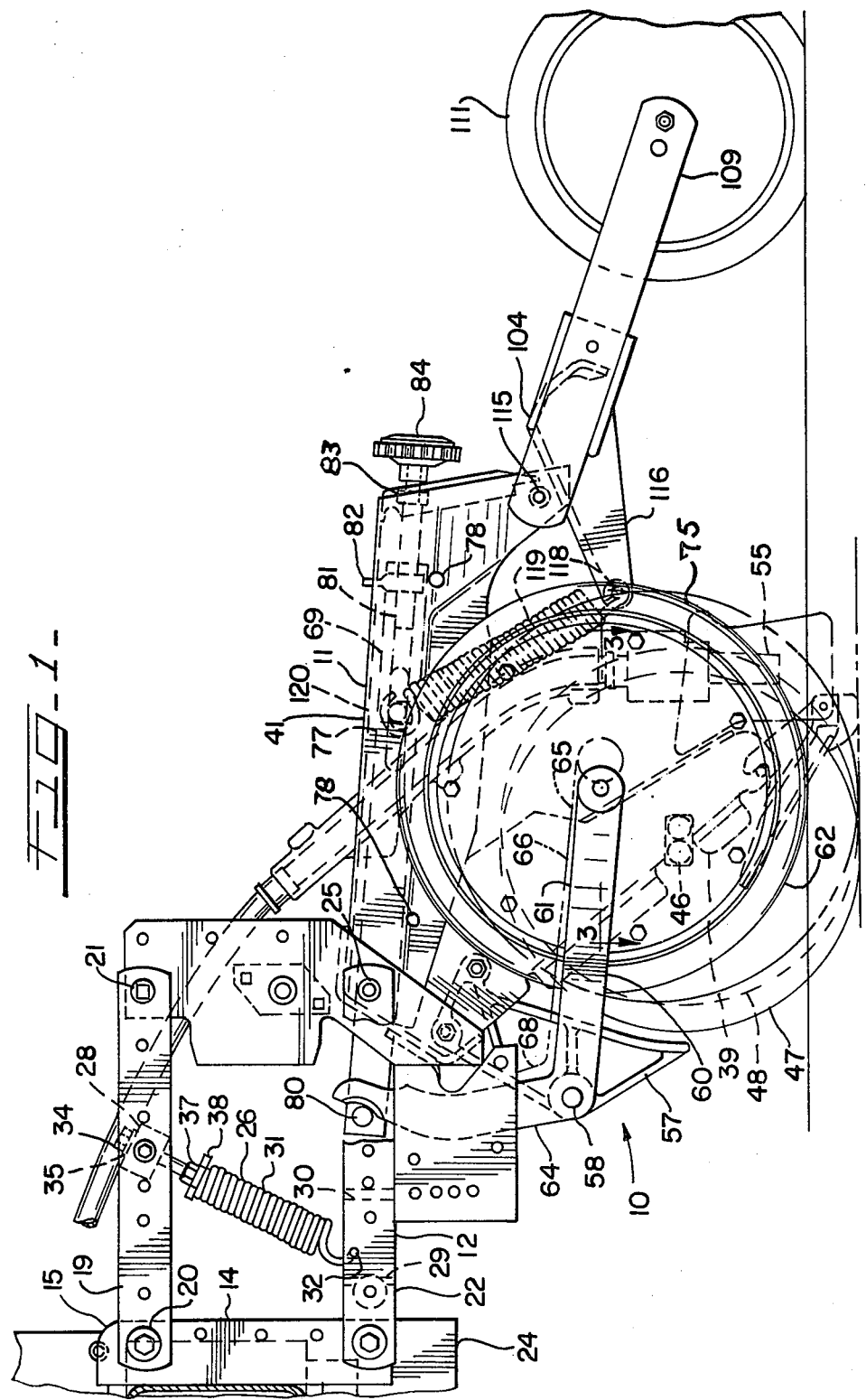

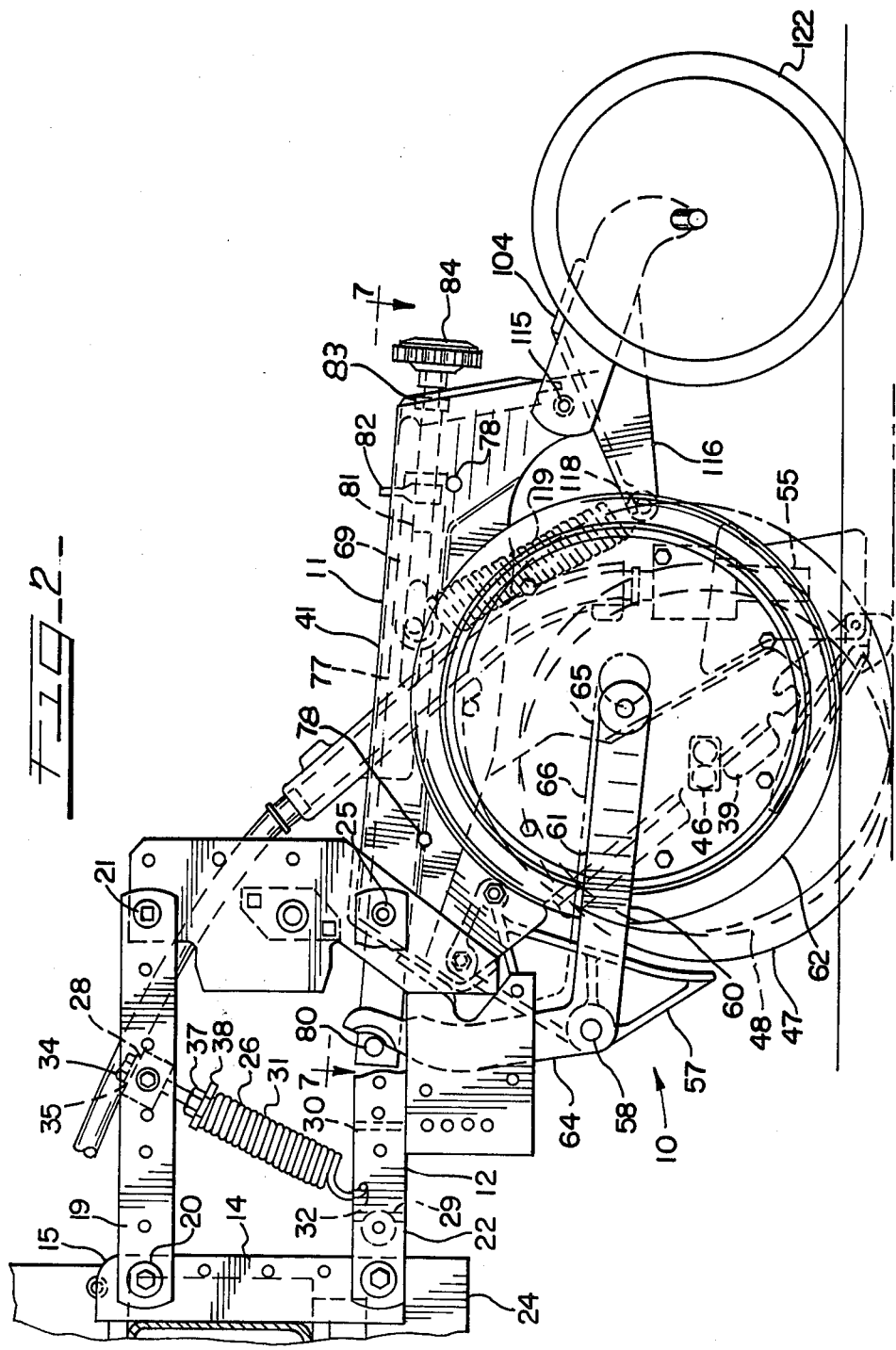

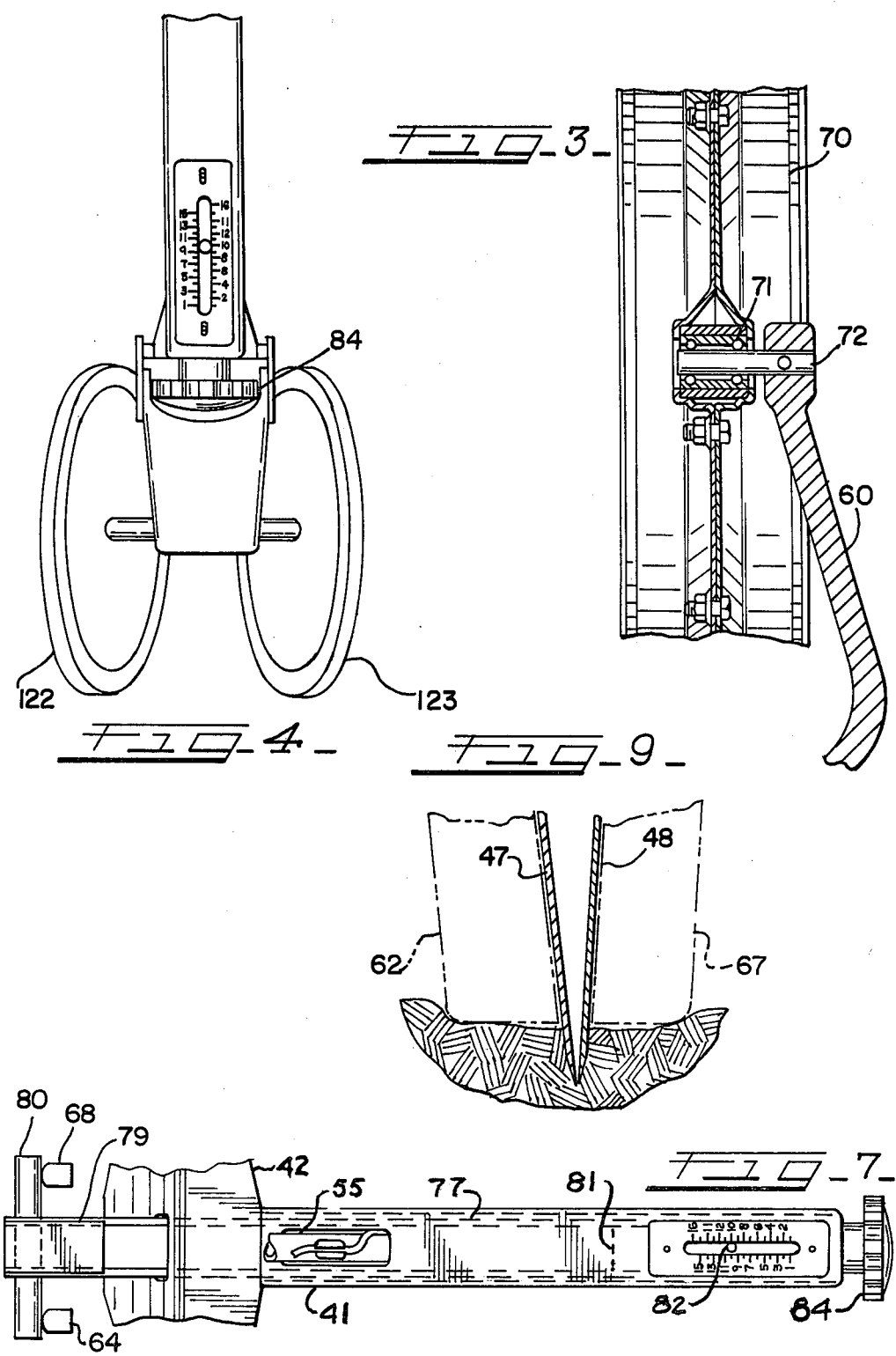

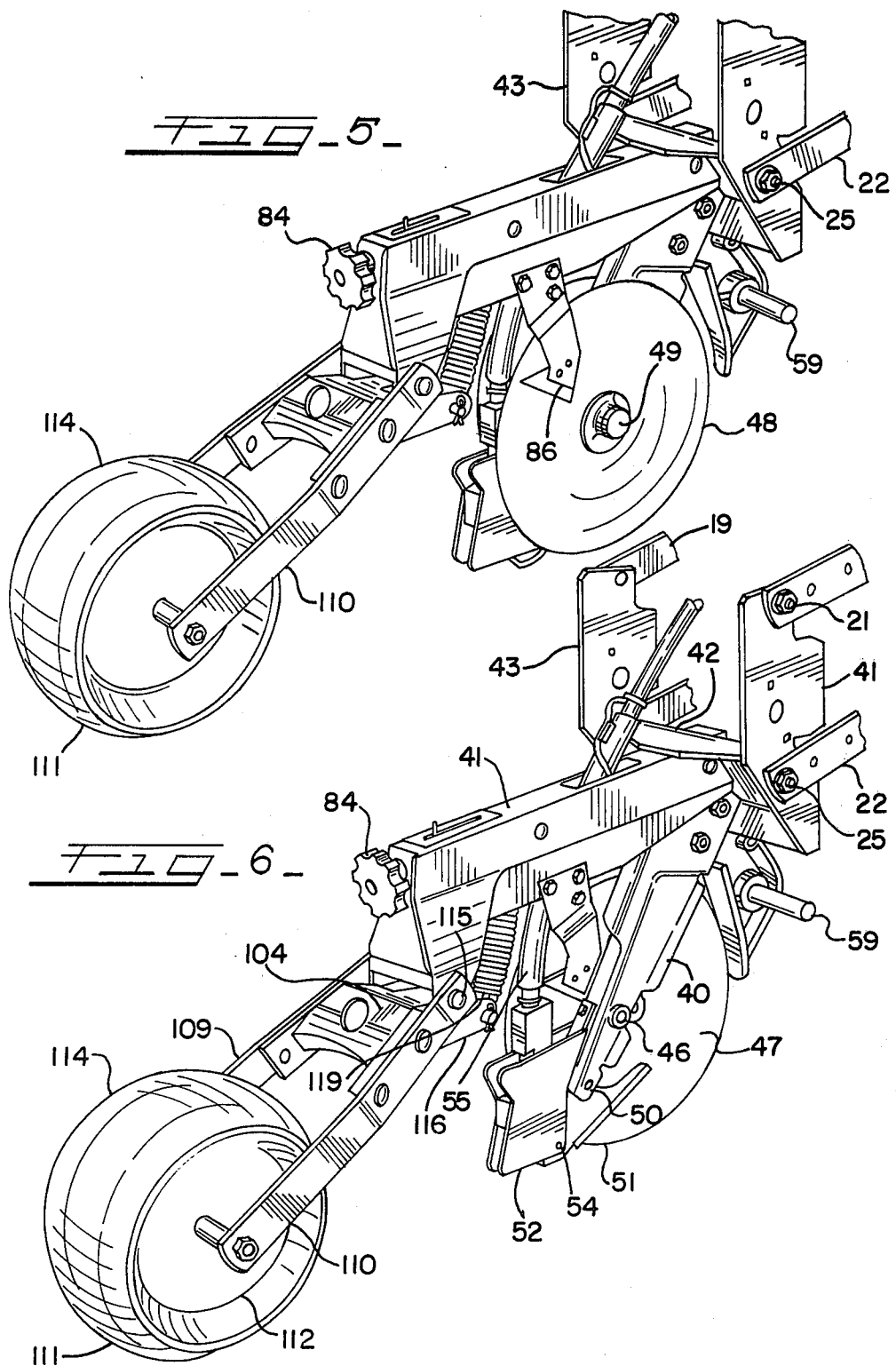

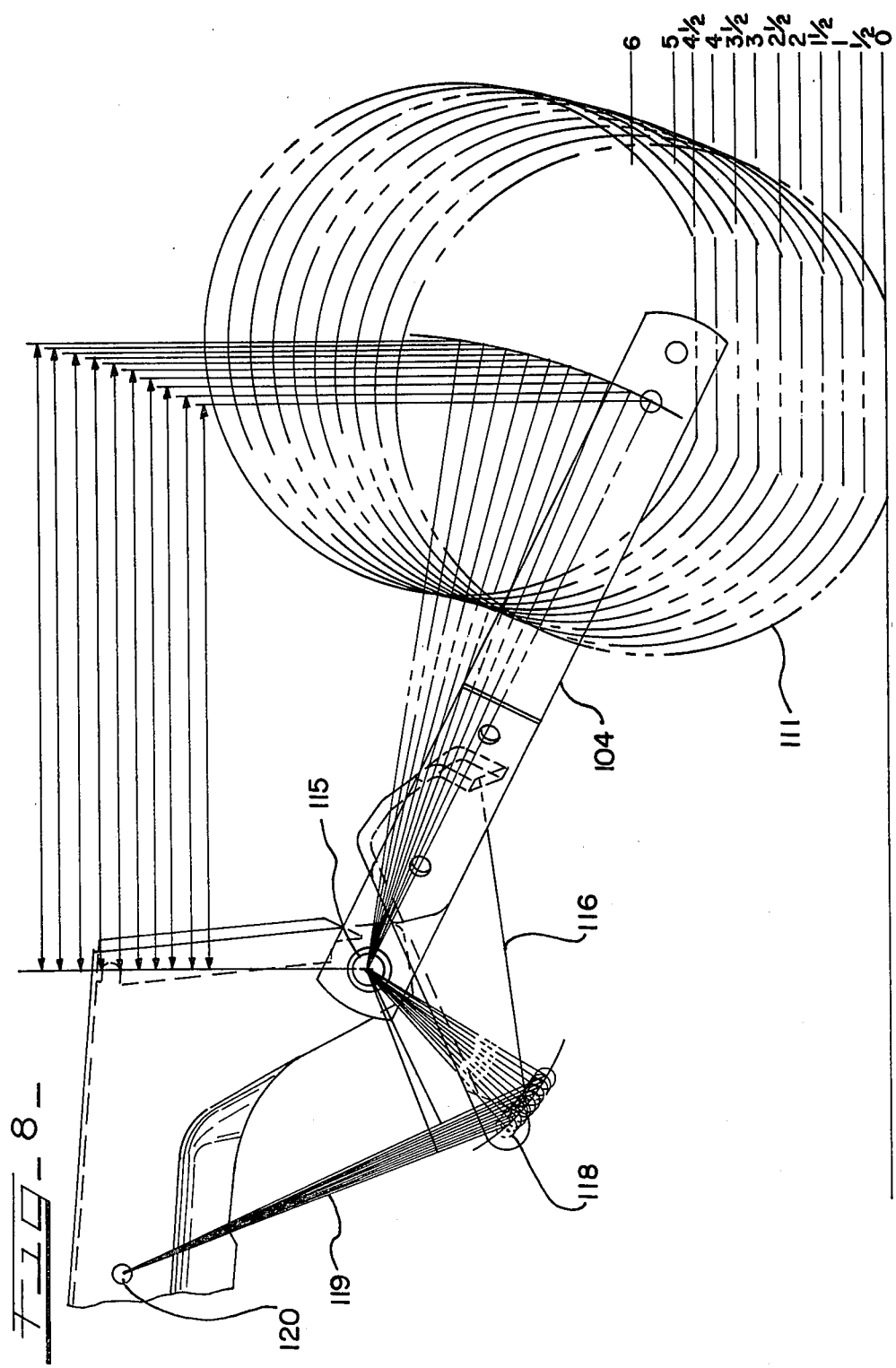

SEED PLANTER APPARATUS WITH COVERING WHEEL

BACKGROUND OF THE INVENTION

1. Field of the Invention

This invention pertains generally to agricultural planting equipment.

2. Description of the Prior Art

The efficient production of crops requires that seed planters meet certain primary design objectives which are: creating a furrow having an accurate planting depth, accurate seed spacing and seed to soil contact. This invention is primarily concerned with the seed to soil contact aspect of the planter.

Known seed planters frequently utilize two separate adjustments which must be made when changing furrow and thus planting depth. The first, is the gauge wheel adjustment which, when some are raised, allows the conventional frame supported dual disk openers to sink deeper into the soil to increase furrow depth. When the gauge wheels are lowered they lift the disks upward from the soil, reducing the depth. In either case, the closing pinch or press wheel pressure must also be adjusted to match the depth set by the disks. In some cases, the highest pressure is used at shallow planting depths where it is not required. In many cases the closing wheel pressure must be adjusted several times. Particularly at deep planting depths, pinch wheels require high pressure (which is usually achieved by adjusting a spring) yet, if the pressure is too heavy it may heavily compact the soil over the seed retarding emergence.

SUMMARY OF THE INVENTION

Applicants in view of the disadvantages noted above designed a seed planter apparatus having furrow closing and seed soil contact structure that better performs this aspect of the planting operation. Specifically, Applicants utilize the prior art dual furrow forming disks mounted on the frame with the disks substantially contacting each other where they enter the soil with the seed tube extending therebetween, and each individually mounted gauge wheel being located laterally adjacent a disk and preferably between the maximum depth of the disk and where same exits the soil for accurate gauging. Support arms for the wheels are moved by a screw thread adjustment to move the wheels to control frame and thus disk depths. Primarily, however, Applicants provide structure wherein changes of furrow depth automatically provide desired related pinch wheels or press wheel pressures without any adjustment needed. Specifically, Applicants carefully select a pivot on the frame from which rearwardly extends the arm structure at the end of which are rotatably mounted a pair of pinch wheels or a press wheel. The arm structure forward and below the pivot is connected to an extension spring whose other end is connected upwardly to the frame. By careful location and positioning of the elements, the moment arms about the pivot exerted by the spring decreases with increasing furrow depths and the moment arms about the pivot of the press wheels or pinch wheels increases with same to counteract spring load so that the force exerted by the press or pinch wheels increases at a constant rate with the same increases of furrow depth. A contrary result occurs with decreasing furrow depth. The actual soil contact, therefore, on the seed remains substantially the same for varying furrow depths which is desired. And this is achieved automatically and without any increase in the number of elements involved.

It is, therefore an object of this invention to provide a new and improved seed planter apparatus.

Another object of this invention is to provide an apparatus wherein changes in furrow depth automatically results in comparable changes in pinch or press wheel pressures.

BRIEF DESCRIPTION OF THE DRAWINGS

FIG. 1 is a side elevational view of the apparatus of this invention that utilize a conventional press wheel;

FIG. 2 is a side elevational view of the apparatus which utilizes pinch closing wheels;

FIG. 3 is a sectional view taken along line 3—3 of a gauge wheel and support arm of the apparatus;

FIG. 4 is a plan view of the pinch wheel portions of FIG. 2;

FIG. 5 is a perspective side view primarily of the right furrow forming disk and scraper with associated gauge wheel removed;

FIG. 6 is a view similar to FIG. 5, but with the right furrow forming disk removed;

FIG. 7 is a partial plan view of the apparatus taken along line 7—7 of FIG. 2 showing the gauge wheel adjustment;

FIG. 8 is a partial, enlarged and schematic view showing to scale the furrow closing and seed soil contact structure of the apparatus and the changing moment arms; and FIG. 9 is a detail showing the gauge wheels, disks and furrow.

DESCRIPTION OF THE PREFERRED EMBODIMENT

Referring to FIGS. 1, 2, 5 and 6, 10 indicates a seed planter apparatus. Apparatus 10 has a frame 11. Apparatus 10 includes a mounting means 12 for attachment to a mobile power source such as a tractor or tool bar. Mounting means 12 includes a head bracket 14 having lateral flanges left hand and right hand (not shown). Bracket 14 has suitable holes for connection thereof to the tool bar by U-bolts (not shown) and nuts. Dual spaced upper links 19 are pivotally connected to the upper part of flanges at pivots 20 by suitable fasteners and are similarly connected to frame 11 at 21. Dual, spaced lower links 22 are similarly connected between the noted flanges at pivots 24 and the frame at 25. The conventional parallel link arrangement described mounts the apparatus for vertical parallel movement thereby allowing the apparatus to follow the ground contour in operation.

Where the apparatus does not have sufficient weight to create the furrow, dual biasing means 26 are provided. Each means 26 extends between channel 28 attached between upper links 19 and support structure which includes tube 29 rigidly connected between links 22 and braces 30 extending between tube 29 and each link 22. Means 26 includes spring 31 having a hook end 32 which connects with a suitable aperture in brace 30. Bolt 34, top washer 35 and lock nut 37 along with internally threaded plug 38 which is also threaded inside spring 31, connect the spring 31 to the top channel 28. It can be seen that spring adjustment can be provided by loosening lock nut 37 and rotating bolt 34 clockwise which will cause the plug 38 to move thereto, thereby extending spring 31. Due to the connection of spring 31 to the upper links 19 remote from pivot 20 compared to end 32 close to pivot 24, links 19 are biased downward and cause the lower links 22 and frame 11 to also move downwardly. Moving top channel 28 to other holes shown in top links 19 will provide further adjustment.

Frame 11 is a weldment that provides the necessary structure for all elements of the apparatus. As shown best in FIGS. 1, 5 and 6, frame 11 consists of left 39 and right hand 40 lower sheets that provide the support for the latter to be described furrow forming disks, compaction runner, deflector, gauge wheels, and press wheel or pinch wheels (FIG. 2). Frame 11 also includes upper channel 41 which is welded to the sheets and which houses the gauge wheel adjustment and spreader plate 42 which primarily provides support for left and right hand plates 43 and 44 on which are mounted pivots 21 and 25 of the parallel bar linkage. Suitable structure in the plates provide stops as desired for the linkage.

Referring also to FIG. 1, support 46 is welded into sheets 39 and 40 and supports furrow forming disks 47 and 48. Preferably the axes of the 14 inch diameter disks are staggered longitudinally by one inch with left disk 47 forward and the axes inclined and they substantially contact at a point forward of their axes at about 38 degrees downwardly from the horizontal. As shown in FIG. 5, flange type bearings 49 are utilized which are rotatably connected to support 46, welded to frame 11, by bolts threaded therein.

Located below support 46 (see FIG. 6) is pin 50 which loosely supports compaction runner 51. Runner 51 also has a lower V-shaped configuration that extends below the disks to provide a desired furrow configuration. Runner 51 is also supported on rearward deflector or shoe 52 via pin 54 with shoe 52 being attached to sheets 39 and 40 by suitable capscrews shown. Shoe 52 is also spaced for seed tube 55 (which is adapted to be connected to any suitable dispenser) which extends therebetween to drop seed rearward of the V-shaped portion of the runner 51 into a furrow. Shoe 52 also prevents the movement of soil into the furrow.

Located forwardly of support 46 and connected between sheets 39 and 40 by suitable fasteners is gauge wheel mounting 57. Mounting 57 has pins 58 and 59 which are staggered longitudinally by one inch as the disks with pin 58 forward and the pins are threaded into the mounting on axes parallel to the disk axes. As shown best in FIG. 1, mounted on pin 58 is left hand arm or support 60. Arm 60 has a rearwardly extending portion 61 that is connected to gauge wheel assembly 62 and a forwardly extending portion 64. Right hand arm or support 65 is similar to 60, and has rearward portion 66 for gauge wheel assembly 67 (not shown in FIG. 1) but because of the staggered mounting, has a longer forward upper portion 68 than 64 since they are transversely aligned to contact gauge wheel depth adjustment mechanism 69. Gauge wheel assembly 62 (also see FIG. 3) is typical for both arms 60 and 65 and includes wheel 70 made from composite elements connected by suitable fasteners and having a semi-pneumatic tire disposed about its periphery. Each arm 60 and 65 is connected to a roller bearing 71 by pin 72. It is to be noted that the bore for pin 72 in arm 60 and 65 is inclined laterally outwardly and downwardly from the associated disk, as shown in FIG. 3, so that a portion of each semi-pneumatic tire 75 will substantially contact its disk opposite the arm at an arc throughout its travel.

Gauge wheel adjustment mechanism 69 is shown best in FIGS. 1 and 7. Adjusting mechanism 69 is located in upper channel 41 of frame 11 and is readily accessible from the end of the apparatus remote from the tool bar. Mechanism 69 includes hollow slide 77 located in channel 41 and supported for movement on pins 78 extending through channel 41. Slide 77 also has an end 79 extending through a suitable opening through spreader plate 42. End 79 is rigid with the slide and has rod 80 extending transversely therethrough and rigid therewith. Rod 80 extends between the ends of 64 of arm 60 and 68 of arm 65 and forward thereof. Therefore rearward movement of slide 77 will force arms 60 and 65 rearwardly causing the associated wheel assemblies to move toward the soil thereby lifting frame 11 and thus raising the disks to create a shallow furrow. Contrary movement will provide a deeper furrow. The movement of slide 77 is caused by a depth adjustment rod 81 having a right hand thread at its rearmost end that is engageable with a complementary internal thread as at 83 in the rearward end of the slide 77. Indicator 82 is similarly threaded on rod 81. Also attached to the end of rod 81 is knob 84. Rotation of knob 84 clockwise will move indicator 82 and slide 77 rearward thus lowering the gauge wheels to create a shallow furrow. The indicator will also move to the zero gauge position shown in broken lines in FIG. 1. Turning counterclockwise will produce a counter result. As shown, the indicator indicates an approximate 2 inch planting depth. Suitable detent means can be provided to maintain knob 84 in the set position.

Scrapers such as right hand scraper 86 (see FIG. 5) which extends from 11 and is located within the gauge wheel arc noted, will remove soil that has passed between wheel and disk. Normally, this soil will fill up the area and move out as water over a dam. However, when the tool bar is raised, and since each arm 60 and 65 can drop away from rod 89 this allows the scraped soil to drop out from this area, aiding in cleaning the apparatus.

Referring to FIG. 1, the gauge wheels are shown in broken lines at the same elevation of the disks at the zero furrow position. The solid line position of the gauge wheels in FIG. 1 discloses a two inch planting furrow, while the upper broken line position shows the approximate highest elevation of the gauge wheels which provides about a maximum three inch furrow depth. Also to be noted from FIG. 1 is that gauging occurs (with little change) between the maximum depth of the disks (laterally adjacent the disks) and where the disks exit the soil. The compaction runner provides a consistent V-shaped furrow while the deflector or shoe prevents soil inflow into the furrow and provides support for the seed tube. The furrow is shown in FIG. 9.

The furrow closing and seed soil contact structure of the apparatus is shown best in FIGS. 1, 2, 4, 5 and 6 with FIG. 8 disclosing the elements schematically to exact scale. Anchor 104 is a casting and is bolted to spaced bars 109 and 110 to provide an arm structure that pivotally connects press wheel 111 to frame 11. Anchor 104 may also provide partial support for any conventional additional furrow closing structure (not shown) if desired. Each bar has a rearward series of holes for the adjustable location thereon by a lengthy suitable bolt and nut. Press wheel 111 has a fabricated support structure 112 which is rotatably mounted via a suitable bearing on the bolt. Semipneumatic tire 114 mounted on structure 112 has preferably a flexible convex curved surface to compact the furrow walls to close the furrow over the seed with good seed to soil contact. The forward ends of arms 109 and 110 are pivotally connected to frame 11 by a suitable pin and fasteners at pivot 115. Also a part of anchor 104 is extension 116 having end clevis forward and below pivot 115 which via pin 118 is connected to extension spring 119. The other end of spring 119 is connected to a pin 120 extending through a slot in slide 77 and into frame 11. Spring 119 biases press wheel 111 downwardly to contact the soil with a greater downward force at deeper furrow depths. As disclosed in FIG. 8, the press wheel location for various furrow depths are shown to scale. As mentioned, the location of pivot 115 was selected along with that of pin 118 so that the moment arms of the spring on pivot decrease with increased spring length at increased furrow depths. The wheel moments also preferably increase thereby reducing the spring effect to provide uniform force increases at uniform furrow depth increases. The weight of the press wheel of 15 lbs. is also taken into consideration. For example, with an extension spring of 250 mm free length and a spring rate of 17.47 Newtons/mm and an initial tension of 465 N., at 1" depth with a spring deflection of 13 mm, the spring load is 692.11 N and the moment arm is 113.86 mm with a moment of 78,803.64 N/mm. With the wheel to the pivot arm of 355.64 mm, the force at the wheel is 221.58 Newtons or 49.79 lbs. At the two inch depth, the spring deflection is 21 mm, load is 831.87 N., moment arm is 111.08 mm and the moment about the pivot is 92,404.12 N/mm. The moment arm is 365.14 mm to the wheel and the wheel load is 253.06 N or 56.87 lbs. This is approximately an increase of 7 lbs per inch depth. At the three inch depth, the spring deflection is 29 mm, the spring load is 971.63 N, 108.10 mm spring arm, moment 105,033.2 N/mm and wheel arm of 372.67 mm, for a wheel load of 281.84 N or 63.33 lbs. At the zero depth, with a 5 mm spring deflection 552.35 N spring load, 116.38 mm spring arm and moment 64282.5 N/mm and wheel arm of 344.01 mm for a wheel load of 186.86 N or 41.99 lbs. Thus between 0" depth to 3" depth, the spring load increased 7.80 lbs., 7.08, 6.46 lbs. indicating substantially the same force increase with the same increase in furrow depth for substantially constant seed soil contact with no adjustment means needed.

The pinch wheels 122 and 123 shown in FIG. 2 and FIG. 4, since having substantially the same structure as the press wheel 111 such as pivots 115 and 118 and extension 116, will achieve the same results if the wheel arm to pivot are the same. The pinch wheels are only shown schematically as they are conventional. Further, there is no drawing to scale of same shown. However, identical wheel loads could be achieved if the wheel moment arms were made to coincide with those shown in FIG. 7.

It is felt that in view of the above description that the operation of the furrow closing and seed soil contact structure of the apparatus is readily apparent as are the resulting advantages from the structure shown and claimed. It is to be noted that while the apparatus shown produces the V-type furrow with flat upper walls that same will perform in similar fashion with gauged furrows with normal furrow characteristics.

What is claimed is:

1. A seed planter apparatus comprising:
   (a) a frame, said frame being adapted to be connected to a mobile power source for towing;
   (b) a pair of opposed furrow-forming disks rotatably mounted on said frame with the disks substantially contacting each other at the approximate point of entry into the soil and diverging apart rearwardly and upwardly relative to the direction of travel;
   (c) a seed tube supported from said frame, one end of said tube extending toward the furrow and the other end being adapted for connection to a seed dispenser;
   (d) a pair of gauge wheel means individually mounted on said frame for regulating the height of the frame from the soil and thus furrow depth, each gauge wheel means including a support pivotally mounted on said frame and a gauge wheel located in contact with the soil generally adjacent the furrow and an outer surface of each disk and rotatably mounted on said support;
   (e) adjustment means for moving said support and said gauge wheels relative to said frame to vary furrow depth; and
   (f) furrow closing and seed soil contact means mounted on said frame, said closing and contact means including an arm structure pivotally mounted on said frame and extending rearwardly to rotatably support furrow closing and seed soil contact structure rearward of said disks to close the soil over the seed, and spring means connected to said frame above said arm structure pivot and to said arm structure below and forward of said pivot, said spring means biasing said arm structure and thus said furrow closing and seed soil contact structure downwardly, and means, including said arm structure and said spring means, for causing the force of the furrow closing and seed soil contact structure on the soil to increase substantially linearly with said furrow depth upon adjustment of said gauge wheels to increase said furrow depth and thus reduce the height of said frame above the soil.

2. The apparatus of claim 1, in which said spring means is connected to said frame forward of said pivot.

3. The apparatus of claim 2, in which the center of mass of said furrow closing and seed soil contact structure moves along an arc extending rearwardly from said pivot.

4. The apparatus of claim 3, in which said spring means is an extension spring.

5. The apparatus of claim 4, in which the connection of said spring to said arm structure is to disposed relative to said pivot that the moment arm of said spring about said pivot decreases with increasing furrow depths.

6. The apparatus of claim 5, in which said arm structure is so disposed relative to said pivot and to the ground that the moment arm of said furrow closing and seed soil contact structure about said pivot increases with increasing furrow depths.

7. The apparatus of claim 6, in which said furrow closing seed soil contact structure is a press wheel for closing the soil over the seed.

8. The apparatus of claim 6, in which said furrow closing seed soil contact structure is a pair of downwardly converging pinch wheels which straddle the furrow.

* * * * *